United States Patent

[11] 3,594,636

| [72] | Inventor | Milton E. Gibbs |
| | | Kearns, Utah |
| [21] | Appl. No. | 826,327 |
| [22] | Filed | May 21, 1969 |
| [45] | Patented | July 20, 1971 |
| [73] | Assignee | Rainbow Neon Sign Company |

[54] ADJUSTABLE LENGTH FLUORESCENT BALLAST, SOCKET AND CIRCUIT ANALYZER
2 Claims, 7 Drawing Figs.

| [52] | U.S. Cl. | 324/51, 324/20 |
| [51] | Int. Cl. | G01r 31/02 |
| [50] | Field of Search | 324/20-24, 72.5, 51, 126, 149 |

[56] References Cited
UNITED STATES PATENTS
2,243,755  5/1941  James .......................... 324/73
3,512,084  5/1970  Roberts et al. ................. 324/149

FOREIGN PATENTS
72,906  7/1951  Denmark ....................... 324/20

*Primary Examiner*—Rudolph V. Rolinec
*Assistant Examiner*—R. J. Corcoran
*Attorneys*—Clarence A. O'Brien and Harvey B. Jacobson ABSTRACT: An elongated adjustable length body provided with terminals on its opposite ends and electrically connectable between the opposing sockets of a fluorescent light fixture in lieu of the associated fluorescent tube thereof. Corresponding end terminals of the body are electrically connected by conductors each having an electrical switch serially disposed therein and the conductors each have a pair of test terminals electrically connected therewith on opposite sides of the associated switch.

PATENTED JUL 20 1971 3,594,636

Milton E. Gibbs
INVENTOR

BY Clarence A. O'Brien
and Harvey B. Jacobson
Attorneys

PATENTED JUL 20 1971
3,594,636
SHEET 2 OF 2
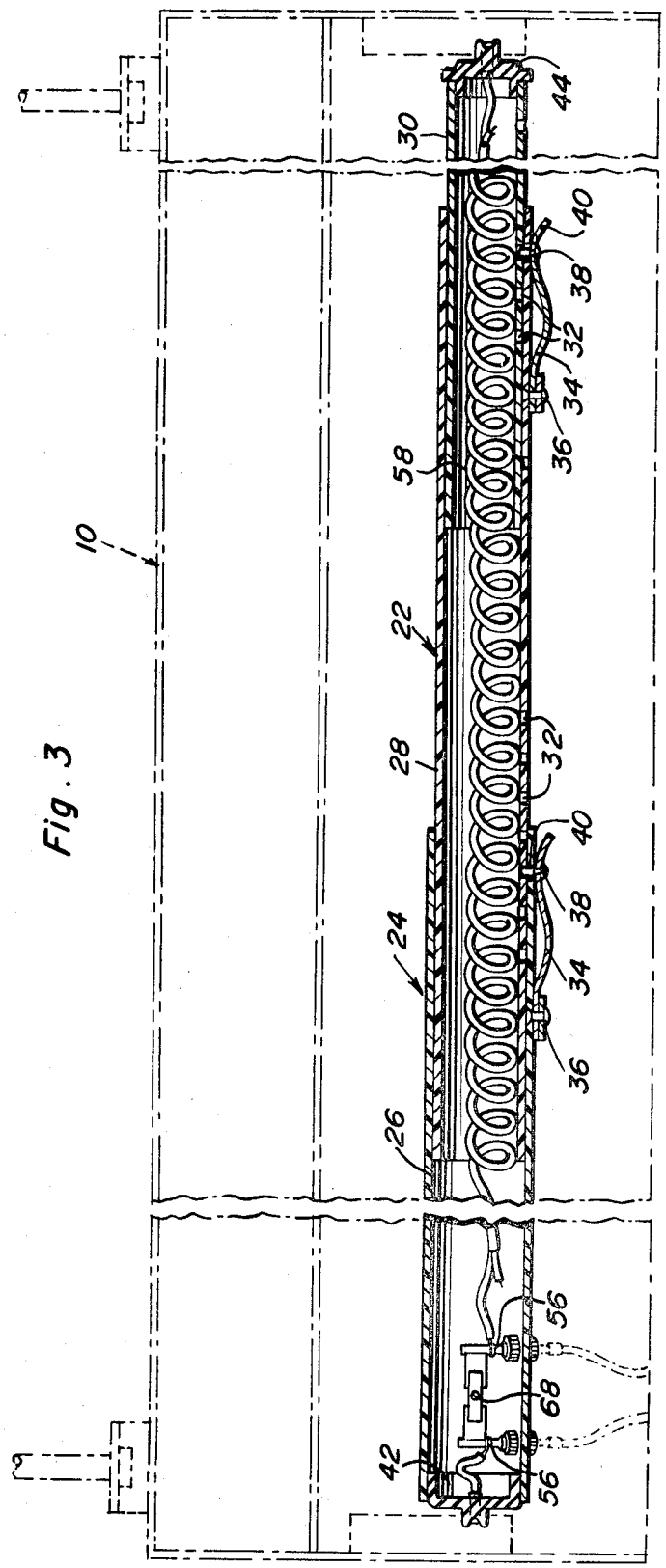
Fig. 3
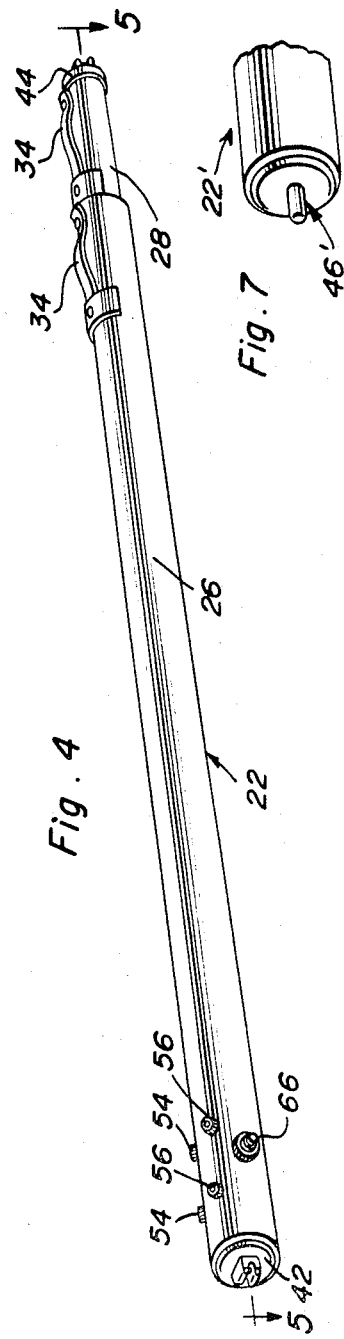
Fig. 4
Fig. 7
Milton E. Gibbs
INVENTOR
BY Clarence A. O'Brien
and Harvey B. Jacobson
Attorneys

3,594,636

ADJUSTABLE LENGTH FLUORESCENT BALLAST, SOCKET AND CIRCUIT ANALYZER

The analyzer of the instant invention has been designed to provide a fast and simple method of testing voltage output of a ballast and testing for shorts, grounds, and continuity of the wiring and lamp holder sockets of an electrical sign or fixture. This may be accomplished without removal of the ballast or the wiring from the sign or fixture.

The tester has a longitudinally extendible elongated body that can be adjusted to various lengths between fluorescent and other light sockets and can be equipped either with single or bipin terminal ends. When it is desired to test or analyze the ballast, circuits or sockets of a fluorescent light fixture, the analyzer is inserted in lieu of the fluorescent tube of the lamp fixture and megger or ohmmeter test leads may be connected to the test terminals of the analyzer in order to analyze the condition of the insulation in the ballast wiring and the lamp holder sockets. Further, the lamp fixture may be tested for shorts, grounds or open circuits and the analyzer may be successively moved to different fluorescent tube positions of a lamp fixture in order to make corresponding tests. The above tests of the various lamp sockets and ballast sections are made with the lamp fixture disconnected from a source of electrical potential. Other tests for high and low voltage may be made when the analyzer is utilized in conjunction with a suitable test meter and the lamp fixture is electrically connected to a source of electrical potential. Also, the analyzer may be utilized to locate a bad lamp in a multilamp circuit by successively inserting the analyzer in each lamp socket with the analyzer switch closed and the multilamp fixture turned on.

The main object of this invention is to provide a circuit analyzer for use in conjunction with fluorescent light fixtures and signs as well as other similar light fixtures and which may be inserted in lieu of a fluorescent tube for accomplishing various analyses of the lamp circuitry for the replaced tube.

Another important object of this invention is to provide an analyzer constructed in a manner so as to be adjustable in length whereby it may be utilized in conjunction with opposing fluorescent lamp tube sockets spaced various distances apart.

Still another object of this invention is to provide an analyzer in accordance with the preceding objects that may be readily reduced to a compact state and transported in a convenient manner from one location to another.

A final object of the invention to be specifically enumerated herein is to provide a device which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an enlarged fragmentary longitudinal vertical sectional view taken substantially upon the plane indicated by the section line 3-3 of FIG. 2;

FIG. 4 is a perspective view of the circuit analyzer;

FIG. 7 is a perspective view of one end of a modified form of analyzer adapted to be utilized in a lamp fixture adapted to receive fluorescent tubes with single end terminals.

Figure 1:
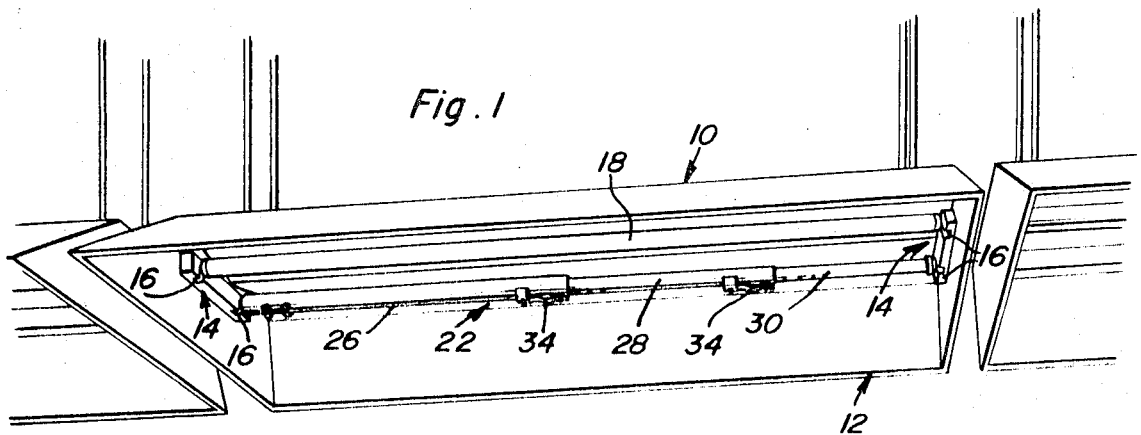
FIG. 1 is a perspective view of a group of fluorescent light fixtures with the circuit analyzer of the instant invention being inserted in one of the light fixtures in lieu of one of the fluorescent light tubes thereof.
Figure 2:
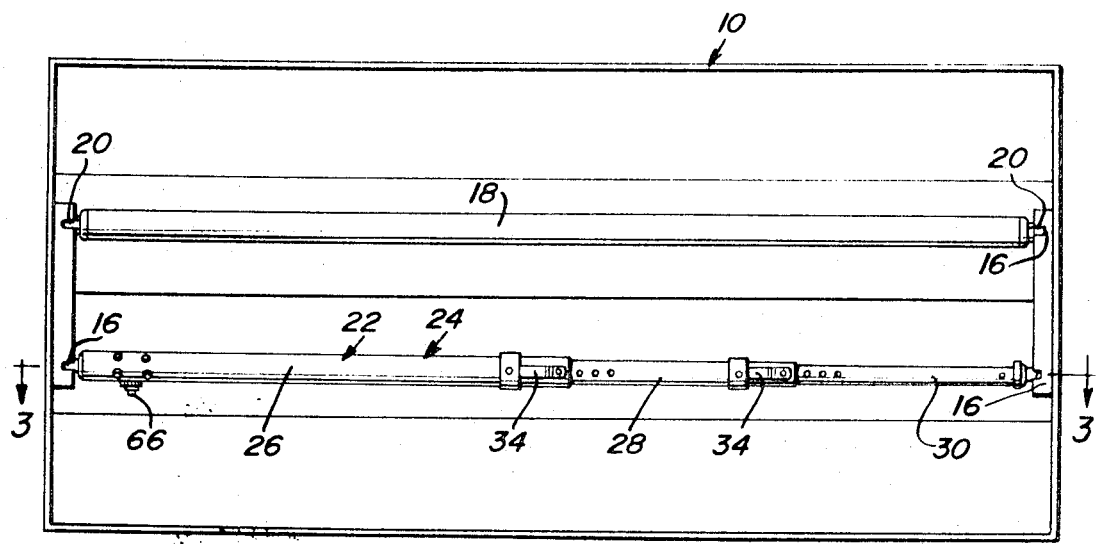
FIG. 2 is an enlarged bottom plan view of the center light fixture illustrated in FIG. 1.
Figure 5:
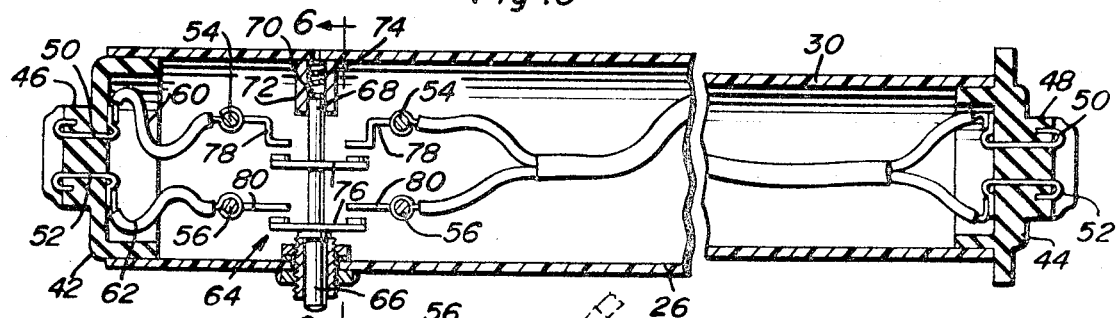
FIG. 5 is a fragmentary enlarged longitudinal vertical sectional view taken substantially upon the plane indicated by the section line 5-5 of FIG. 4.
Figure 6:
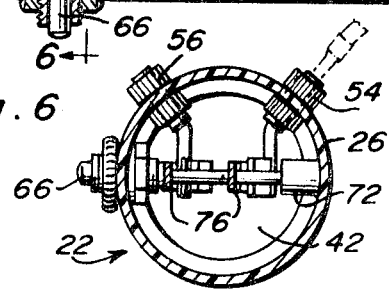
FIG. 6 is a transverse sectional view taken substantially upon the plane indicated by the section line 6-6 of FIG. 5.

Referring now more specifically to the drawings, the numeral 10 generally designates a conventional form of overhead suspended fluorescent light fixture including an upper light reflective hood assembly 12 and a pair of opposite end socket assemblies referred to in general by the reference numerals 14. The socket assemblies 14 each includes a pair of tube end receiving sockets 16 and each fluorescent light fixture is conventionally provided with a pair of fluorescent light tubes 18 provided with end terminals 20 seated within the sockets 16. The sockets 16 each includes a pair of contact terminals (not shown) with which the end terminals 20 of the fluorescent light tubes 18 are electrically engaged. The fluorescent light tubes 18 comprise electrical connections between the corresponding sockets 16 and the preceding is to be understood as conventional design.

The analyzer of the instant invention is referred to in general by the reference numeral 22 and includes an elongated body referred to in general by the reference numeral 24. The body 24 includes three snugly telescopingly engaged tubular body sections 26, 28 and 30. The body section 26 is larger in diameter than the sections 28 and 30 and one end of the section 28 is snugly telescoped in the adjacent end of the section 26. Further, one end of the section 30 is telescoped in the end of the section 28 remote from the section 26. Each of the sections 28 and 30 is provided with a plurality of longitudinally spaced apertures 32 and the sections 26 and 28 include leaf spring latches 34 anchored at one pair of corresponding ends to the sections 26 and 28 as at 36 and provided with locating pins 38 at their free ends which are receivable through apertures 40 provided therefor in the sections 26 and 28 and selected apertures 32 formed in the sections 28 and 30 whereby the sections 28 and 30 may be releasably retained in adjusted extended positions relative to the sections 26 and 28, respectively.

The remote ends of the sections 26 and 30 are provided with end plugs 42 and 44 secured within the sections 26 and 30 and the end plugs 42 and 44 include terminal assemblies 46 and 48 which project outwardly of the remote ends of the sections 26 and 30. Each of the terminal assemblies 46 and 48 includes a pair of terminals 50 and 52 for contact and electrical connection with the corresponding terminals (not shown) in the sockets 16.

First and second pairs of test jacks 54 and 56 are secured through longitudinally spaced areas of the wall portions of the body section 26 and the pairs of test jacks 54 and 56 are spaced circumferentially about the base section 26. An elongated double conductor and coiled electrical cord 58 extends through the sections 28 and 30 and into the end of the section 26 adjacent the section 28. One conductor of the electrical cord 58 is electrically connected between the terminal 50 of the section 30 and the adjacent test jack 54 while the other conductor of the cord 58 is connected between the terminal 52 of the section 30 and the adjacent test jack 56. In addition, the electrical cord 58 includes short conductor sections 60 and 62 electrically connecting the terminal 50 of the section 26 with the adjacent test jack 54 and the terminal 52 of the section 26 with the adjacent test jack 56.

A make-and-break switch assembly referred to in general by the reference numeral 64 is secured within the section 26 and includes a reciprocal push plunger type of actuator 66 slidable through one wall portion of the body section 26. The actuator includes an end portion 68 remote form the end portion thereof slidably received through the corresponding wall portion of the section 26 and the end portion 68 is slidably received within a counterbore 70 formed in a mounting boss 72 formed integrally with the inner side of the wall portion of the body section 26 remote from that portion of the body section 26 through which the actuator 66 is slidably received. A compression spring 74 is seated within the counterbore 70 behind the end portion 68 and therefore urges the actuator 66 toward its outermost position.

The actuator 66 includes a pair of contact bars 76 and each side of the switch assembly 64 includes a pair of contact terminals 78 and 80 supported from the inner ends of the corresponding test jacks 54 and 56. The contact bars 76 are operable to electrically connect corresponding contact terminals 78 and 80 and are normally spaced from the latter when the compression spring 74 is allowed to bias the actuator 66 toward its outermost limit position. However, when the outer end of the actuator 66 is thrust inwardly, the contact bars 76 simultaneously contact and bridge the pairs of contact terminals 78 and 80 whereby the corresponding terminals 50 and 52 are electrically connected.

In operation, when it is desired to test the fluorescent light fixture and the various electrical components thereof, one of the fluorescent light tubes 18 may be removed. THereafter, the analyzer 22 is inserted within the fixture 10 in place of the removed tube. Then, with suitable electrical test equipment electrically connected to the terminals 54, the corresponding portion of the fixture 10 and its electrical components may be tested for determining the presence of shorts, grounds, open circuits and also the condition of the insulation in the ballast wiring and lamp holder sockets. Of course, the same tests may be performed by electrically connecting suitable test equipment to the terminal jacks 56. Also, when the switch assembly 64 is closed and the current to the fluorescent light fixture 10 is on, it can be determined whether the fluorescent light tube 18 that was removed was faulty, the indication of the removed fluorescent light tube being faulty being given if the other fluorescent light tube 18 is properly electrically energized when the switch assembly 64 is closed.

Numerous tests can successfully be performed on the fixture 10 by utilizing the analyzer 22 and suitable electrical testing equipment electrically connected to the analyzer 22 by way of the test jack 54 and 56. Further, inasmuch as the analyzer 22 is adjustable in length, it may be utilized in fluorescent light fixtures whose tube end receiving sockets are spaced varied distances apart.

With attention now invited more specifically to FIG. 7 of the drawings, there may be seen a fragmentary view of one end of a modified form of analyzer referred to in general by the reference numeral 22' and which is substantially identical to the analyzer 22 except for the terminal assemblies 46' on the opposite ends thereof adapting the analyzer 22' for use in fluorescent light fixtures adapted to receive single terminal end fluorescent light tubes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What I claim as new is as follows:

1. A test instrument for fluorescent light fixtures and the like, said instrument comprising an elongated body provided with a pair of contact terminal means on each of its opposite ends for electrical connection with the contact elements in the opposing sockets of a fluorescent light fixture and support of said body from said fixture when the terminals on the body are engaged in said sockets in lieu of a fluorescent light tube, a pair of conductors electrically connecting the terminal means on one end of said body with the corresponding terminal means at the other end of said body, said conductors each including switch means serially connected therein and contact jacks electrically connected to said conductors an opposite sides of said switch means, said body being hollow and said conductors extending through the inside of said body, said switch means including actuator means therefor operable from the exterior of said body and said contact jacks being accessible from the exterior of said body.

2. The combination of claim 1 wherein said body includes a plurality of relatively lengthwise extendable elongated sections and means operatively connected between said sections for releasably maintaining the latter in adjusted extended positions.